United States Patent
Kim et al.

(10) Patent No.: US 8,094,742 B2
(45) Date of Patent: Jan. 10, 2012

(54) DIGITAL TELEVISION TRANSMITTER/RECEIVER AND METHOD OF PROCESSING DATA IN DIGITAL TELEVISION TRANSMITTER/RECEIVER

(75) Inventors: Byoung Gill Kim, Seoul (KR); In Hwan Choi, Gyeonggi-do (KR); Woo Chan Kim, Gyeonggi-do (KR); Jae Hyung Kim, Seoul (KR); Hyoung Gon Lee, Seoul (KR); Jong Moon Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 826 days.

(21) Appl. No.: 11/456,760

(22) Filed: Jul. 11, 2006

(65) Prior Publication Data

US 2007/0104284 A1    May 10, 2007

(30) Foreign Application Priority Data

Nov. 8, 2005  (KR) .................. 10-2005-0106691

(51) Int. Cl.
*H04L 5/12* (2006.01)
(52) U.S. Cl. .................. 375/265; 375/261
(58) Field of Classification Search .................. 375/265; 714/292

See application file for complete search history.

(56) References Cited

U.S. PATENT DOCUMENTS

| | | | | |
|---|---|---|---|---|
| 5,570,391 A * | 10/1996 | Lin et al. | ........ | 375/265 |
| 5,956,373 A * | 9/1999 | Goldston et al. | ........ | 375/298 |
| 6,166,594 A * | 12/2000 | Nielsen et al. | ........ | 329/319 |
| 6,212,230 B1 * | 4/2001 | Rybicki et al. | ........ | 375/239 |
| 6,219,386 B1 * | 4/2001 | Amrany et al. | ........ | 375/261 |
| 6,295,015 B1 * | 9/2001 | Jones et al. | ........ | 341/143 |
| 6,334,187 B1 * | 12/2001 | Kadono | ........ | 713/176 |
| 6,459,741 B1 | 10/2002 | Grabb | | |
| 6,530,060 B1 * | 3/2003 | Vis et al. | ........ | 714/792 |
| 6,738,949 B2 * | 5/2004 | Senda et al. | ........ | 714/796 |
| 6,744,822 B1 * | 6/2004 | Gaddam et al. | ........ | 375/265 |
| 6,775,334 B1 | 8/2004 | Liu | | |

(Continued)

FOREIGN PATENT DOCUMENTS

EP    0 677 965 A2    10/1995

(Continued)

OTHER PUBLICATIONS

ATSC, "ATSC Standard: Digital Television Standard (A/53), Revision D, Including Amendment No. 1", ATSC Doc. A/53D, Jul. 19, 2005.

*Primary Examiner* — Chieh M Fan
*Assistant Examiner* — Santiago Garcia
(74) *Attorney, Agent, or Firm* — Lee, Hong, Degerman, Kang & Waimey

(57) ABSTRACT

A digital television (DTV) transmitter and a method of processing known data in the DTV transmitter are disclosed. The method of processing known data in a digital television (DTV) transmitter includes generating a known data sequence, trellis-encoding the known data sequence, the trellis-encoded known data sequence having upper, middle, and lower bits, wherein at least one of the upper, middle, and lower bits has an m-sequence property, and mapping the trellis-encoded known data sequence into one of 2-level, 4-level, and 8-level data sequences, wherein the mapped data sequence has substantially an m-sequence property, wherein a data sequence has an m-sequence property when a peak value among auto-correlation values of the data sequence having a length of N is 1 and all the off-peak auto-correlation values are −1/N.

6 Claims, 9 Drawing Sheets

U.S. PATENT DOCUMENTS

| | | |
|---|---|---|
| 6,803,970 B1 | 10/2004 | Limberg |
| 6,810,084 B1* | 10/2004 | Jun et al. .................. 375/240.28 |
| 6,810,090 B1* | 10/2004 | Perlow .......................... 375/301 |
| 6,882,690 B1* | 4/2005 | Berggren et al. ............. 375/265 |
| 6,909,743 B1* | 6/2005 | Ward et al. ............... 375/240.01 |
| 6,956,619 B2 | 10/2005 | Choi et al. |
| 7,020,828 B2* | 3/2006 | Birru .............................. 714/792 |
| 7,151,575 B1* | 12/2006 | Landry et al. ................. 348/723 |
| 7,206,352 B2* | 4/2007 | Birru et al. .................... 375/265 |
| 7,653,143 B2* | 1/2010 | Kim et al. ...................... 375/270 |
| 7,675,994 B2* | 3/2010 | Gaddam et al. ............... 375/301 |
| 7,733,426 B2* | 6/2010 | Lee et al. ....................... 348/726 |
| 2004/0158798 A1* | 8/2004 | Senda et al. ................... 714/792 |
| 2005/0031097 A1* | 2/2005 | Rabenko et al. ........... 379/93.31 |
| 2005/0132413 A1* | 6/2005 | Barreyro et al. .............. 725/100 |
| 2006/0244865 A1* | 11/2006 | Simon ........................... 348/614 |
| 2006/0245505 A1* | 11/2006 | Limberg ................. 375/240.27 |
| 2006/0285608 A1* | 12/2006 | Kim et al. ...................... 375/300 |
| 2007/0094566 A1* | 4/2007 | Park et al. ..................... 714/753 |
| 2007/0094567 A1* | 4/2007 | Park et al. ..................... 714/753 |
| 2007/0104284 A1* | 5/2007 | Kim et al. ...................... 375/265 |
| 2007/0113145 A1* | 5/2007 | Yu et al. ......................... 714/755 |
| 2007/0253502 A1* | 11/2007 | Park et al. ..................... 375/265 |
| 2008/0049824 A1* | 2/2008 | Yang et al. .................... 375/232 |
| 2008/0112479 A1* | 5/2008 | Garmany et al. ............. 375/231 |
| 2008/0137525 A1* | 6/2008 | Liu ................................. 370/203 |
| 2008/0151942 A1* | 6/2008 | Lee et al. ....................... 370/510 |
| 2008/0170162 A1* | 7/2008 | Kim et al. ...................... 348/725 |
| 2008/0273121 A1* | 11/2008 | Jeong et al. ................... 348/726 |
| 2009/0060097 A1* | 3/2009 | Kim et al. ...................... 375/341 |
| 2009/0103657 A1* | 4/2009 | Park et al. ..................... 375/340 |
| 2009/0103660 A1* | 4/2009 | Park et al. ..................... 375/341 |
| 2009/0116580 A1* | 5/2009 | Park et al. ..................... 375/295 |

FOREIGN PATENT DOCUMENTS

| | | |
|---|---|---|
| KR | 1020010111667 | 12/2001 |
| KR | 1020020089078 | 11/2002 |
| KR | 1020050077255 | 8/2005 |
| KR | 10-2005-0097438 | 10/2005 |
| KR | 1020050107286 | 11/2005 |
| WO | WO 95/16312 A | 6/1995 |

* cited by examiner

| C2C1C0 | VSB Level |
|--------|-----------|
| 111    | +7        |
| 110    | +5        |
| 101    | +3        |
| 100    | +1        |
| 011    | -1        |
| 010    | -3        |
| 001    | -5        |
| 000    | -7        |

US 8,094,742 B2

DIGITAL TELEVISION TRANSMITTER/RECEIVER AND METHOD OF PROCESSING DATA IN DIGITAL TELEVISION TRANSMITTER/RECEIVER

This application claims the benefit of the Korean Patent Application No. 10-2005-0106691, filed on Nov. 8, 2005, which is hereby incorporated by reference as if fully set forth herein.

BACKGROUND OF THE INVENTION

1. Field of the Invention

The present invention relates to a digital telecommunications system, and more particularly, to a digital television (DTV) transmitter/receiver and a method of processing data in the DTV transmitter/receiver. Although the present invention is suitable for a wide scope of applications, it is particularly suitable for modulating a digital television signal to a vestigial side band (VSB) mode and transmitting and receiving the VSB modulated digital television signal.

2. Discussion of the Related Art

The 8T-VSB transmission mode, which is adopted as the standard for digital broadcasting in North America and the Republic of Korea, is a system that has been developed for the transmission of MPEG video/audio data. However, presently, the technology for processing digital signals is being developed at a vast rate, and, as a larger number of the population uses the Internet, digital electric appliances, computers, and the Internet are being integrated. Therefore, in order to meet with the various requirements of the users, a system that can add video/audio data through a digital television channel so as to transmit diverse supplemental information needs to be developed.

Some users may assume that supplemental data broadcasting would be applied by using a PC card or a portable device having a simple in-door antenna attached thereto. However, when used indoors, the intensity of the signals may decrease due to a blockage caused by the walls or disturbance caused by approaching or proximate mobile objects. Accordingly, the quality of the received digital signals may be deteriorated due to a ghost effect and noise caused by reflected waves. However, unlike the general video/audio data, when transmitting the supplemental data, the data that is to be transmitted should have a low error ratio. More specifically, in case of the video/audio data, errors that are not perceived or acknowledged through the eyes or ears of the user can be ignored, since they do not cause any or much trouble. Conversely, in case of the supplemental data (e.g., program execution file, stock information, etc.), an error even in a single bit may cause a serious problem. Therefore, a system highly resistant to ghost effects and noise is required to be developed.

The supplemental data are generally transmitted by a time-division method through the same channel as the MPEG video/audio data. However, with the advent of digital broadcasting, ATSC VSB digital television receivers that receive only MPEG video/audio data are already supplied to the market. Therefore, the supplemental data that are transmitted through the same channel as the MPEG video/audio data should not influence the conventional ATSC VSB receivers that are provided in the market. In other words, this may be defined as ATSC VSB compatibility, and the supplemental data broadcast system should be compatible with the ATSC VSB system. Herein, the supplemental data may also be referred to as enhanced data or EVSB data. Furthermore, in a poor channel environment, the receiving quality of the conventional ATSC VSB receiving system may be deteriorated. More specifically, resistance to changes in channels and noise is more highly required when using portable and/or mobile receivers.

SUMMARY OF THE INVENTION

Accordingly, the present invention is directed to a digital television (DTV) transmitter and a method of processing known data in the DTV transmitter that substantially obviate one or more problems due to limitations and disadvantages of the related art.

An object of the present invention is to provide a digital television system that is suitable for transmitting supplemental data and that is highly resistant to noise.

Another object of the present invention is to provide a digital television (DTV) transmitter and a method of processing known data in the DTV transmitter that can insert known data in a specific area of the supplemental data and transmitting the data to a transmitter/receiver, thereby enhancing the receiving quality of the digital television system.

A further object of the present invention is to provide a device and method for generating known data having excellent auto-correlation characteristics.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of processing known data in a digital television (DTV) transmitter includes generating a known data sequence, trellis-encoding the known data sequence, the trellis-encoded known data sequence having upper, middle, and lower bits, wherein at least one of the upper, middle, and lower bits has an m-sequence property, and mapping the trellis-encoded known data sequence into one of 2-level, 4-level, and 8-level data sequences, wherein the mapped data sequence has substantially an m-sequence property, wherein a data sequence has an m-sequence property when a peak value among auto-correlation values of the data sequence having a length of N is 1 and all the off-peak auto-correlation values are −1/N.

In another aspect of the present invention, a method of processing known data in a digital television (DTV) transmitter includes generating a known data sequence, trellis-encoding the known data sequence, the trellis-encoded data sequence having upper, middle, and lower bits, wherein the upper bit is identical to any one of the middle and lower bits and has an m-sequence property, and mapping the trellis-encoded known data sequence into 4-level data sequence, wherein the mapped data sequence has substantially an m-sequence property, wherein a data sequence has an m-sequence property when a peak value of auto-correlation values of the data sequence having a length of N is 1 and all the off-peak auto-correlation values are −1/N.

In another aspect of the present invention, a method of processing known data in a digital television (DTV) transmitter includes generating a known data sequence, trellis-encoding the known data sequence, the trellis-encoded data sequence having upper, middle, and lower bits, wherein the upper bit is opposite to any one of the middle and lower bits and has an m-sequence property, and mapping the trellis-encoded known data sequence into 4-level data sequence, wherein the mapped data sequence has substantially an m-sequence property, wherein a data sequence has an m-sequence property when a peak value of auto-correlation values of the data sequence having a length of N is 1 and all the off-peak auto-correlation values are −1/N.

In another aspect of the present invention, a method of processing known data in a digital television (DTV) transmitter includes generating a known data sequence, guarding the known data sequence by adding of a preamble and a postamble, trellis-encoding the guarded known data sequence, and mapping the trellis-encoded known data sequence into one of 2-level, 4-level, and 8-level data sequences, wherein the mapped data sequence has substantially an m-sequence property, wherein a data sequence has an m-sequence property when a peak value of auto-correlation values of the data sequence having a length of N is 1 and all the off-peak auto-correlation values are −1/N.

In another aspect of the present invention, a digital television (DTV) transmitter includes a known data generator for generating a known data sequence, and a trellis encoder for trellis-encoding the known data sequence to generate upper, middle, and lower bits and for mapping the upper, middle, and lower bits into one of 2-level, 4-level, and 8-level data sequences, wherein at least one of the upper, middle, and lower bits having an m-sequence property and the mapped data sequence has substantially an m-sequence property, wherein a data sequence has an m-sequence property when a peak value among auto-correlation values of the data sequence having a length of N is 1 and all the off-peak auto-correlation values are −1/N.

In another aspect of the present invention, a digital television (DTV) transmitter includes a known data generator for generating a known data sequence, and a trellis encoder for trellis-encoding the known data sequence to generate upper, middle, and lower bits and for mapping the upper, middle, and lower bits into one of 2-level, 4-level, and 8-level data sequences, wherein the upper bit is identical to any one of the middle and lower bits and has an m-sequence property, and the mapped data sequence has substantially an m-sequence property, wherein a data sequence has an m-sequence property when a peak value among auto-correlation values of the data sequence having a length of N is 1 and all the off-peak auto-correlation values are −1/N.

In another aspect of the present invention, a digital television (DTV) transmitter includes a known data generator for generating a known data sequence, and a trellis encoder for trellis-encoding the known data sequence to generate upper, middle, and lower bits and for mapping the upper, middle, and lower bits into one of 2-level, 4-level, and 8-level data sequences, wherein the upper bit is opposite to any one of the middle and lower bits and has an m-sequence property, and the mapped data sequence has substantially an m-sequence property, wherein a data sequence has an m-sequence property when a peak value among auto-correlation values of the data sequence having a length of N is 1 and all the off-peak auto-correlation values are −1/N.

In a further aspect of the present invention, a digital television (DTV) transmitter includes a known data generator for generating a known data sequence, and a trellis encoder for trellis-encoding the known data sequence to generate upper, middle, and lower bits and for mapping the upper, middle, and lower bits into one of 2-level, 4-level, and 8-level data sequences, wherein the mapped data sequence has substantially an m-sequence property and a preamble and a postamble are added to the mapped data sequence, wherein a data sequence has an m-sequence property when a peak value among auto-correlation values of the data sequence having a length of N is 1 and all the off-peak auto-correlation values are −1/N.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

The present invention relates to inserting known data known by the transmitter/receiver in a specific area of an enhanced data packet and transmitting the processed data packet, thereby enhancing the receiving performance of the receiving system. Most particularly, the present invention relates to generating known data having an excellent auto-correlation characteristic, thereby enhancing the receiving performance of the receiving system. Herein, the known data generator according to the present invention should be placed in front of the trellis encoder in the digital television transmitter according to the present invention.

Figures 1A, 1B:
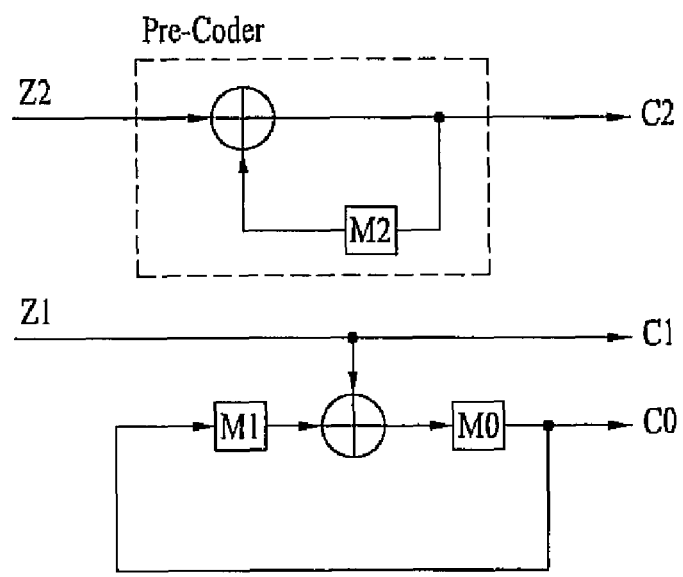
FIG. 1A and FIG. 1B each illustrates a general example of a trellis encoder and mapping, respectively.

FIG. 1A illustrates a block view of a trellis encoder according to an embodiment of the present invention. Herein, twp input bits Z1 and Z2 are encoded and outputted as three bits C0 to C2. Among the input bits, the upper bit Z2 is pre-coded by the pre-coder and outputted as C2. The lower bit Z1 is trellis-encoded and outputted as C1 and C0. The output C2C1C0 of the trellis encoder is mapped to an 8-level VSB signal, as shown in FIG. 1B. At this point, one symbol of the known data is configured of two bits. And, the characteristic of the known data corresponding to the output of the trellis encoder is determined depending upon the data type allocated to each of the two bits. More specifically, the trellis encoder pre-codes the upper bit Z2 of the known data symbol and outputs the pre-coded upper bit Z2 as C2. And, the trellis encoder trellis-encodes the lower bit Z1 and outputs the trellis-encoded lower bit Z1 as C1 and C0.

At this point, the known data may be configured as 2-level known data, 4-level known data, and 8-level known data, whenever required, at the output of the trellis encoder. More specifically, the 2-level known data may include 2-level known data including a DC bias (or DC biased 2-level known data), and 2-level known data that do not include the DC bias (or DC unbiased 2-level known data). In case of the DC unbiased 2-level known data, the 4 types of symbol group of the known data that may be outputted from the trellis encoder includes {−1,+1}, {−3,+3}, {−5,+5}, and {−7,+7}. Herein, the absence of the DC bias signifies that the mean value (or average) of symbol group is equal to '0'. Conversely, the presence of the DC bias indicates that the mean value of symbol group is equal not to '0'.

Figure 2:
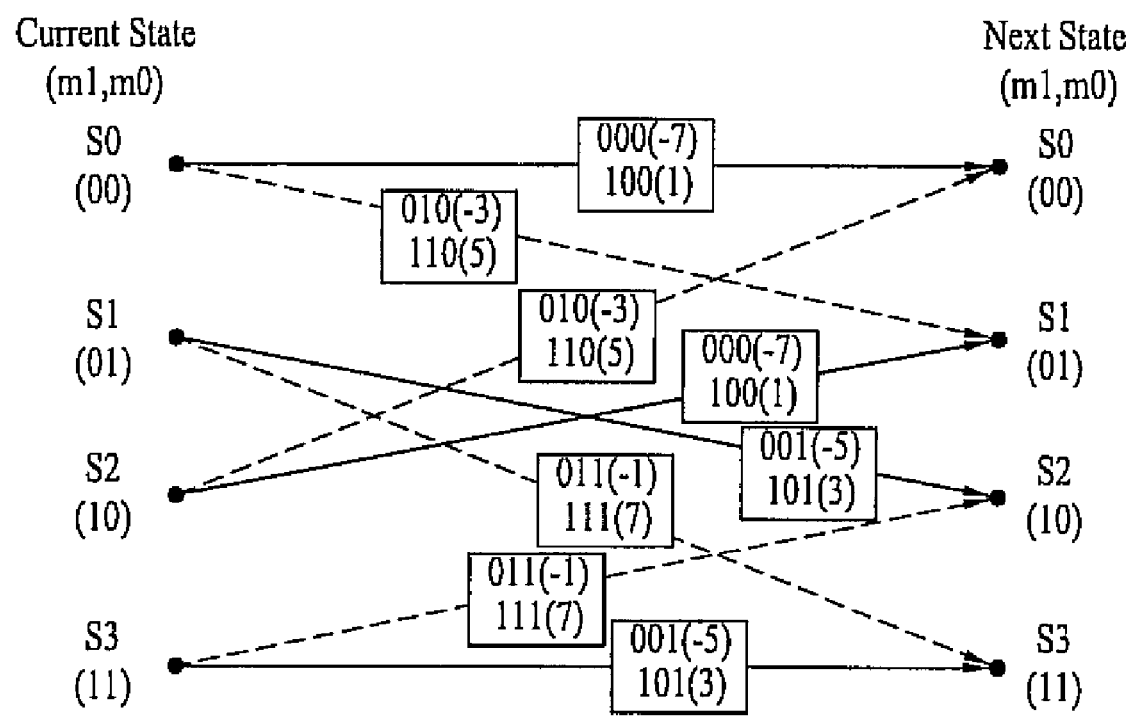
FIG. 2 illustrates a state transition diagram of the trellis encoder shown in FIG. 1A.

However, when the known data level is limited to only one symbol group among the 4 symbol group types described above, the possible cycles of the known data is limited to 3 cycles or less. For a better understanding, reference will be made to the graph showing a state transition of FIG. 2, provided that the symbol group of the desired known data is {−5,+5}, for example. Herein, when the starting state of the trellis encoder is 'S0', among the symbol group {−5,+5}, the possible output is 5(110), and the next state of the encoder becomes 'S1'. When the current state is 'S1', the possible output among the symbol group {−5,+5} is −5(001), and the next state of the encoder becomes 'S2'. If the current state is 'S2', the possible output among the symbol group {−5,+5} is 5, and the next state of the encoder becomes 'S0'. Afterwards, this pattern is repeated. More specifically, when the known data of the output of the trellis encoder is {−5,+5}, the only possible pattern is 5, −5, 5, 5, −5, 5, . . . , which corresponds to a 3-cycle pattern.

Further, for each of the remaining 3 symbol group types (i.e., {−1,+1}, {−3,+3}, and {−7,+7}), the possible cycles of the known data is also limited to 3 cycles or less. Accordingly, since each cycle is similar to that of {−5,+5}, the detailed description of the same will be omitted for simplicity. Although the DC unbiased 2-level known data may be configured as described above, the auto-correlation characteristic of the data is poor.

Figure 3:
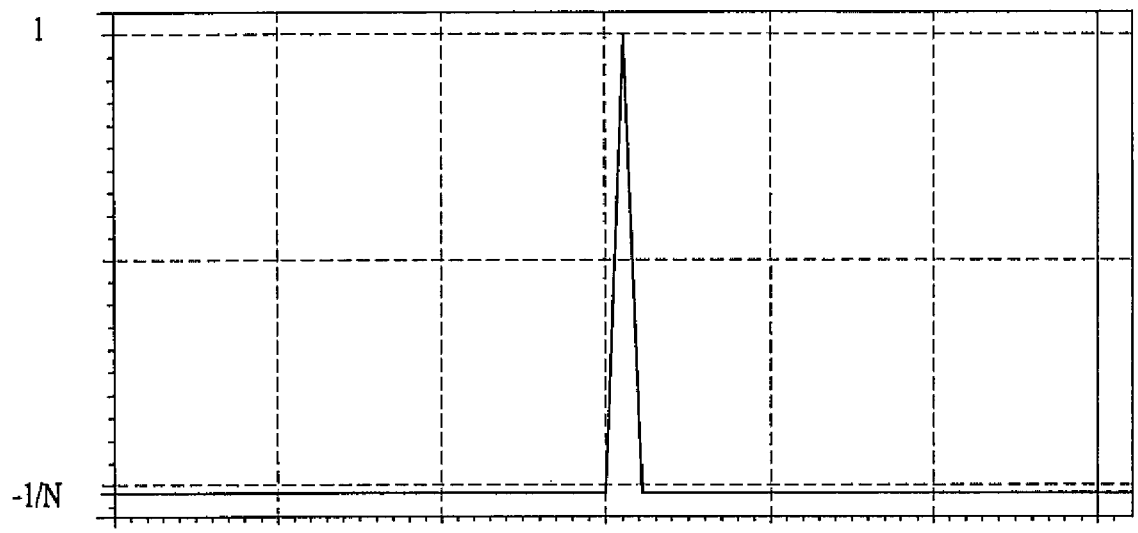
FIG. 3 illustrates a general example of an auto-correlation characteristic of an m-sequence, wherein the length is N.

Hereinafter, the DC biased 2-level known data will now be described. For example, when a known data symbol group {−7, 1} is selected, '−7' and '1' may be arbitrarily selected due to the input of Z2, as shown in FIG. 1. Herein, when the known data is inputted to Z2, DC biased known data having the same input known data, cycle, and pattern may be obtained from the output of the trellis encoder. An m-sequence having an excellent auto-correlation characteristic may be given as an example of the known data that can be used herein. FIG. 3 shows the auto-correlation value of a length-N m-sequence, and the auto-correlation value is obtained by correlating the sequence with itself by performing a cyclic shift. As shown in FIG. 3, the auto-correlation of the m-sequence marks a value of '1' at its peak (or a peak value of '1') and has the value of '−1/N' in the remaining sections (or off-peak auto-correlation values of '−1/N'). Therefore, if a known data signal (or code) is configured to have the m-sequence property, a set of known data being DC biased and having an excellent auto-correlation characteristic that is efficient for performing synchronization and channel estimation from the receiver may be obtained from the output of the trellis encoder.

If the known data outputted from the trellis encoder correspond to the 4-level DC unbiased known data, the following six(6) types of symbol combination may be included: {−7,−5,5,7}, {−7,−3,3,7}, {−7,−1,1,7}, {−5,−3,3,5}, {−5,−1,1,5}, and {−3,−1,1,3}. These symbol combinations may be obtained by applying a constant limit condition to the output of the trellis encoder. For example, the symbol combination {−7,−5,5,7} corresponds to the case when C2=C1, among the three output bits C2, C1, and C0 of the trellis encoder of FIG. 1. Furthermore, {−7,−3,3,7} corresponds to when C2=C0, {−7,−1,1,7} corresponds to when C1=C0, {−5,−3,3,5} corresponds to when C1≠C0, {−5,−1,1,5} corresponds to when C2≠C0, and {−3,−1,1,3} corresponds to when C2≠C1. Therefore, by setting up the input of the trellis encoder so that the output of the trellis encoder satisfies the above-mentioned condition, desired known data corresponding to an arbitrary cycle may be obtained.

Although it is difficult to create the m-sequence by using the above-described six 4-level symbol combinations, by having the sign of the known data symbol (after symbol mapping) to be similar to the m-sequence, a set of known data conforming to the m-sequence and having an excellent auto-correlation characteristic may be created. More specifically, known data are created so that the pattern of C2, which corresponds to the sign of the known data, is set to be identical to the pattern of the m-sequence. For example, in case of the symbol combination {−7,−5,5,7}, since the constraint is C2=C1, C2 and C1 should both be changed in accordance with the pattern of the m-sequence. Accordingly, a set of 4-level known data having the sign of the symbol corresponding to the m-sequence pattern may be obtained from the output of the trellis encoder.

Meanwhile, in case of the 8-level known data of the output of the trellis encoder, different sets of known data independent from one another are inputted to the inputs Z2 and Z1 of the trellis encoder. The inputs Z2 and Z1 may correspond to arbitrary known data and their respective periods may also be set arbitrarily. As an example of the known data used herein, known data may be created so that the output bit C2 determining the sign of the trellis encoder output has the m-sequence property. More specifically, different types of m-sequences independent from one another can be inputted to each of Z1 and Z2 of FIG. 1, so as to make the sign of the known data sequence have the m-sequence property when being outputted from the trellis encoder. Different types of m-sequence may be inputted to the inputs Z1 and Z2. Alternatively, data may be extracted from one m-sequence in 2-bit units and then respectively inputted to each of Z1 and Z2. Furthermore, 12 trellis encoders are used in the actual digital television transmitter. Therefore, in order to allow the known data patterns to have the m-sequence pattern at the output of the trellis encoder, known data of the trellis encoder input should be generated by considering the 12 trellis encoders.

Figure 4A:
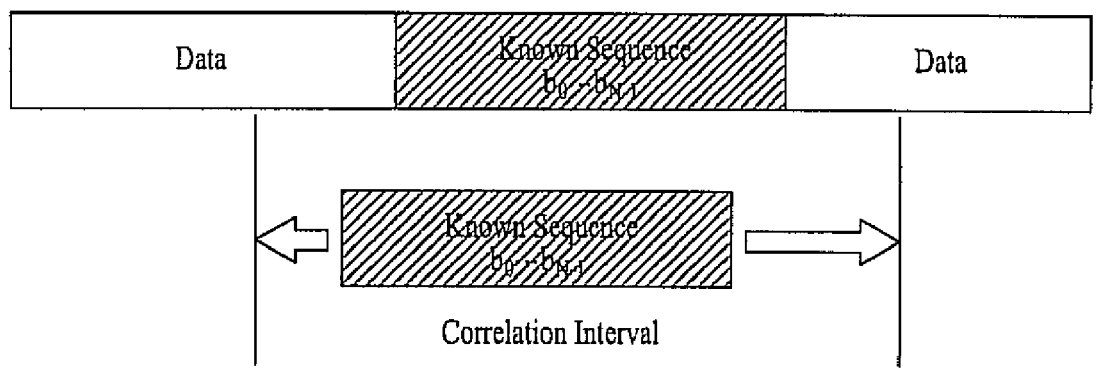
FIG. 4A and FIG. 4B illustrate examples of a known data sequence according to the present invention.

Meanwhile, when the digital television receiver uses the known data to perform synchronization and channel estimation, a sliding correlation is obtained between the received data and the known data. At this point, as shown in FIG. 4A, general data which is not known to the receiver may be included in the correlation sections. And, accordingly, a jitter effect occurs in the correlation result due to the general data. This is because the pattern of the known data is constant, whereas the pattern of the general data is random. Furthermore, such jitter effect deteriorates the synchronization performance and the channel estimation performance of the receiving system. Therefore, in order to prevent such performance degradation from occurring, the data structure of the present invention further includes a preamble and a postamble in the known data known sequence so as to add a guard section to the known data.

Figure 4B:
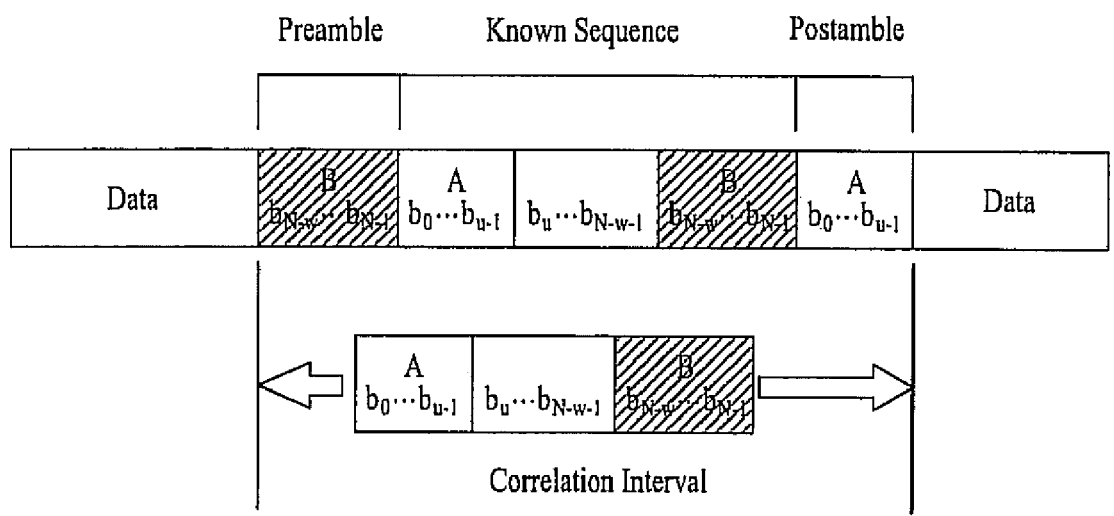

Referring to FIG. 4B, w number of data set B at the end of the known data sequence is copied and added to the beginning of the known data sequence. This copied and newly added section is referred to as the preamble section. In addition, u number of data set A at the beginning of the known sequence is copied and added to the end of the known sequence. This second copied and newly added section is referred to as the postamble section. Furthermore, the transmitting system transmits the known data of the preamble section, the known data section, and the postamble section.

Accordingly, in the receiving system, the section having the preamble and postamble added thereto is limited as the correlation section (or correlation interval) Herein, the correlation between the received data and the known data is first obtained by using only the initial set of known data. Then, the correlation between the known data sequence and its cyclic shifted sequence may be obtained from the correlation section. Therefore, by using the above-described data structure, the interference caused by the general data can be excluded, and only the correlation of the known data can be obtained from the receiver, thereby enhancing the synchronization performance and the channel estimation performance of the receiving system. At this point, the both lengths of the preamble section and the postamble section may be equal to '0' or equal to a value other than '0', or only one of the two lengths may be equal to '0'. For example, if the length of the preamble section is equal to '0', this indicates that the preamble section does not exist within the known data sequence.

Figure 5:
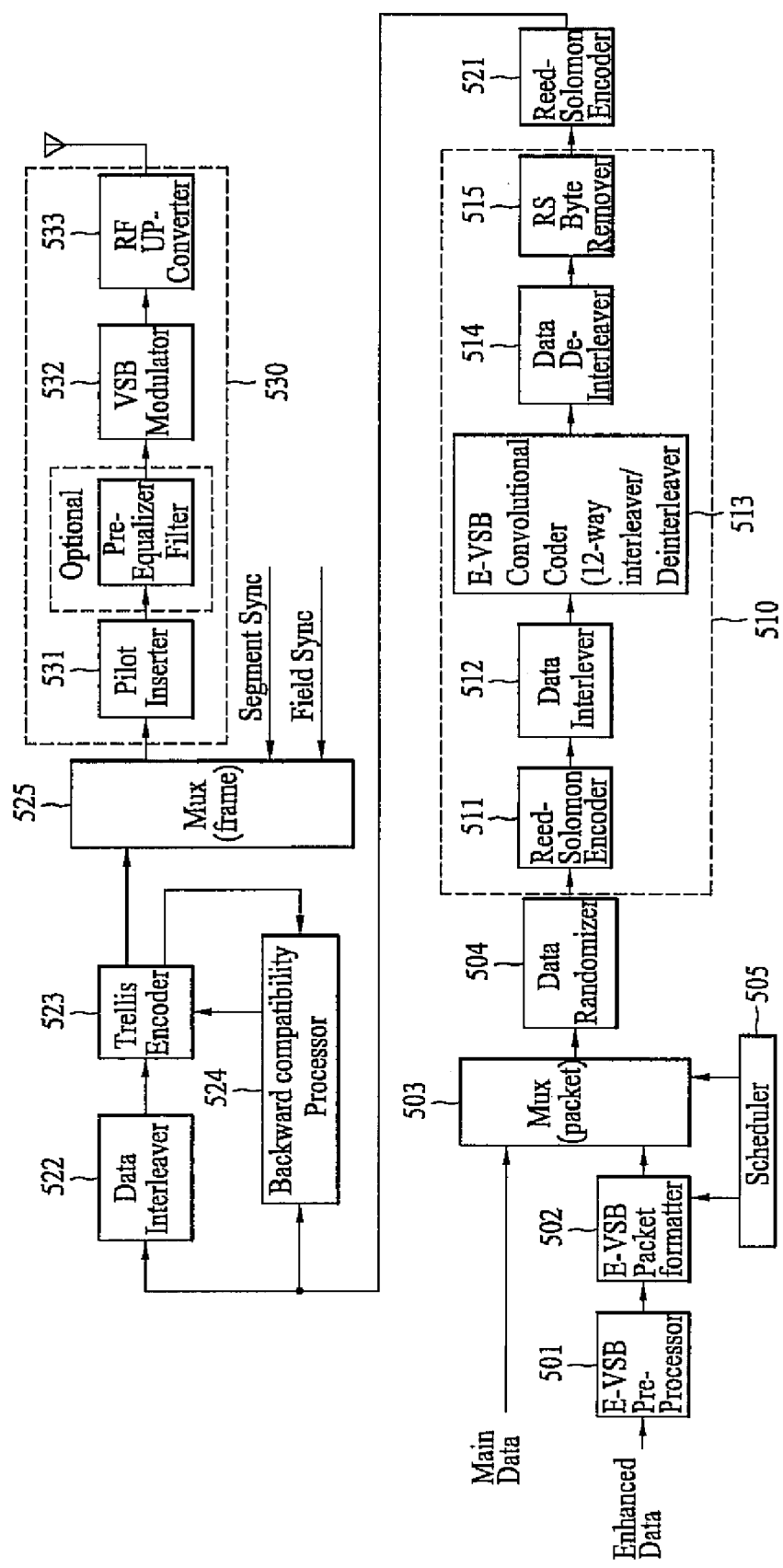
FIG. 5 illustrates a block view showing the structure of a digital television transmitter according to an embodiment of the present invention.

FIG. 5 illustrates an example of the digital television transmitter according to an embodiment of the present invention, which is provided with the above-described known data generator. This digital television transmitter has already been disclosed by the same applicant of the present invention, and the known data generator is included in the E-VSB packet formatter 502, shown in FIG. 5.

As described above, the present invention may allow the 2-level known data, the 4-level known data, and the 8-level known data to include signals each having the m-sequence property, when outputted from the trellis encoder 523. As shown in FIG. 1, bit C2 that corresponds to an output signal of the trellis encoder 523 is a result of the input bit Z2 of the trellis encoder 523 passing through the pre-coder. Therefore, if an m-sequence that has already passed through a post-decoder is inputted to Z2, the output bit C2 which is pre-coded by the pre-coder of the trellis encoder may include the m-sequence property.

Figure 7A:
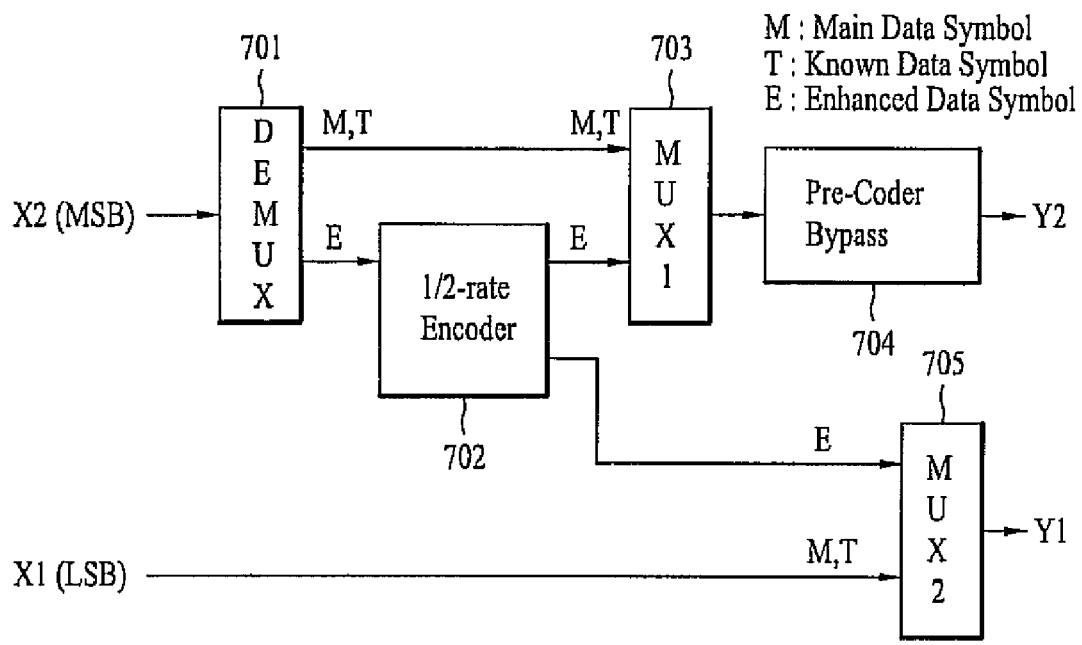
FIG. 7A and FIG. 7B illustrates examples of an E-VSB symbol processor according to the present invention.
Figure 7B:
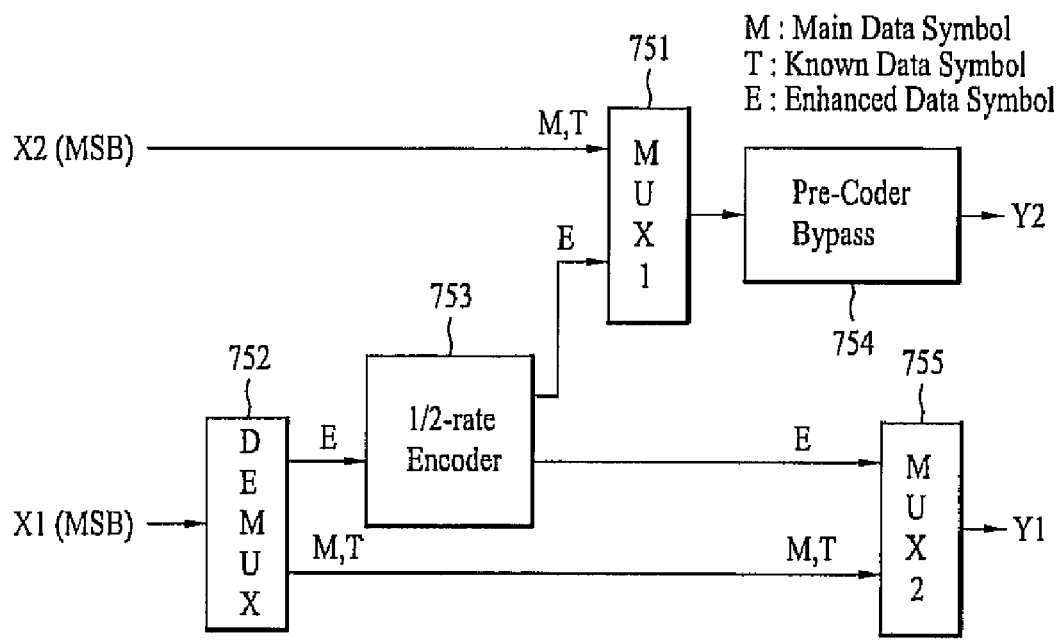

As another embodiment of the present invention, the known data generator generating the known data may be included in an E-VSB symbol processor within an E-VSB convolutional encoder 513. In this case, a known data place holder that ensures a place (or position) of the known data in advance is inserted in an E-VSB packet formatter 502. FIG. 7A and FIG. 7B illustrate examples of the E-VSB symbol processor according to the present invention.

FIG. 7A corresponds to a structure in which only an upper bit X2 among the two input bits of the enhanced data symbol is encoded and outputted as 2 bits, and in which a lower bit X1 is discarded (or deleted). More specifically, the upper bit X2 of the main data symbol and the known data symbol passes through a demultiplexer 701 and a first multiplexer 703 so as to be outputted to the pre-coder bypass 704. Further, the upper bit X2 of the enhanced data symbol is convoultional encoded by a ½-rate encoder 702 so as to be outputted as two bits. Herein, one of the two output bits passes through the first multiplexer 703 so as to be outputted to the pre-coder bypass 704. Alternatively, the other bit is outputted to a second multiplexer 705. When the input symbol is an enhanced data symbol, the second multiplexer 705 selects the output bit of the ½-rate encoder 702 instead of the input bit X1, the selected bit being outputted as a lower bit Y1. When the input symbol is a main data symbol or a known data symbol, the second multiplexer 705 selects the input bit X1, which is then outputted as the lower bit Y1.

FIG. 7B corresponds to a structure in which only a lower bit X1 among the two input bits of the enhanced data symbol is encoded and outputted as 2 bits, and in which an upper bit X2 is discarded (or deleted). More specifically, the upper bit X2 of the main data symbol and the known data symbol passes through a first multiplexer 751 so as to be outputted to the pre-coder bypass 754. Further, the lower bit X1 of the main data symbol and the known data symbol passes through a demultiplexer 752 and a second multiplexer 755 so as to be outputted as a lower bit Y1.

Meanwhile, the lower bit X1 of the enhanced data symbol is convoultional encoded by a ½-rate encoder 753 so as to be outputted as two bits. Herein, one of the two output bits is outputted to the first multiplexer 751, and the other bit is outputted to the second multiplexer 755. When the input symbol is an enhanced data symbol, the first multiplexer 751 selects the output bit of the ½-rate encoder 753 instead of the input bit X2 and outputs the selected bit to the pre-coder bypass 754. Alternatively, when the input symbol is a main data symbol or a known data symbol, the first multiplexer 751 selects the input bit X2 and outputs the selected bit to the pre-coder bypass 754.

As described above, the pre-coder bypass 704 and 754 directly bypasses the main data symbol and the known data symbol and post-decodes and outputs the enhanced data symbol. Referring to FIG. 7A and FIG. 7B, when the MPEG header byte inserted in the enhanced data packet and the parity byte inserted by the RS encoder are converted to symbols, the converted symbols are treated as the main data symbol.

Figure 8A:
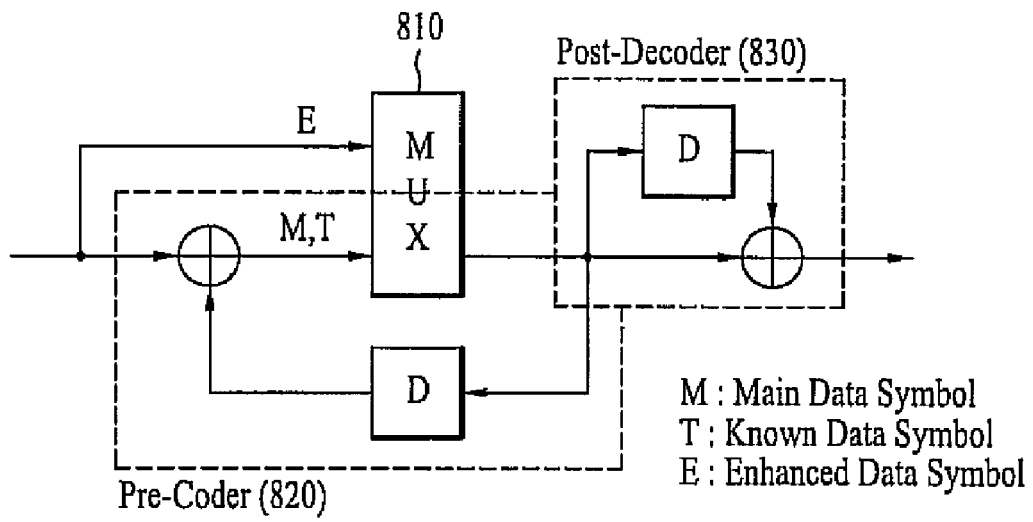
FIG. 8 illustrates a detailed block view of the pre-coder bypass shown in FIGS. 7A and 7B according to an embodiment of the present invention.

FIG. 8A illustrates a detailed block view of the pre-coder bypass according to an embodiment of the present invention. Referring to FIG. 8A, the pre-coder bypass according to the present invention includes a multiplexer 810, a pre-coder 820, and a post-decoder 830. Herein, the post-decoder 830 performs an inverse process of the pre-coder 820. The multiplexer 810 selects either an input bit or an output bit of the pre-coder 820 in accordance with the input data symbol type. Then, the multiplexer 810 outputs the selected input bit or output bit of the pre-coder 820 to the post-decoder 830. If the input data is an enhanced data symbol, the multiplexer 810 selects the input bit. Conversely, if the input data is one of a known data symbol and a main data symbol, the multiplexer 810 selects the output bit of the pre-coder 820. Thereafter, the selected bit is outputted to the post-decoder 830. Accordingly, the post-decoder 830 post-decodes and outputs the output of the multiplexer 810.

If a main data symbol and a known data symbol are inputted to the pre-coder bypass of FIG. 8A, the inputted main data symbol and known data symbol sequentially pass through the pre-coder 820 and the post-decoder 830. Therefore, a value equal to that of the input bit is outputted. Accordingly, when the main data and the known data pass through the pre-coder included in the trellis encoder, the main data and the known data are pre-coded. Meanwhile, when the enhanced data symbol is inputted, the input symbol only passes through the post-decoder 830. This indicates that when the symbol passes though the pre-coder of the trellis encoder, the enhanced data symbol bypasses the pre-coder.

Figure 6:
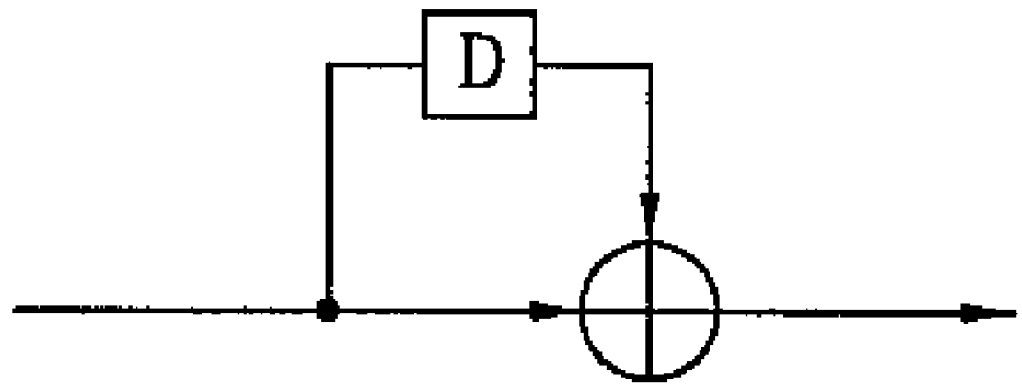
FIG. 6 illustrates a post-decoder according to an embodiment of the present invention.
Figure 8B:
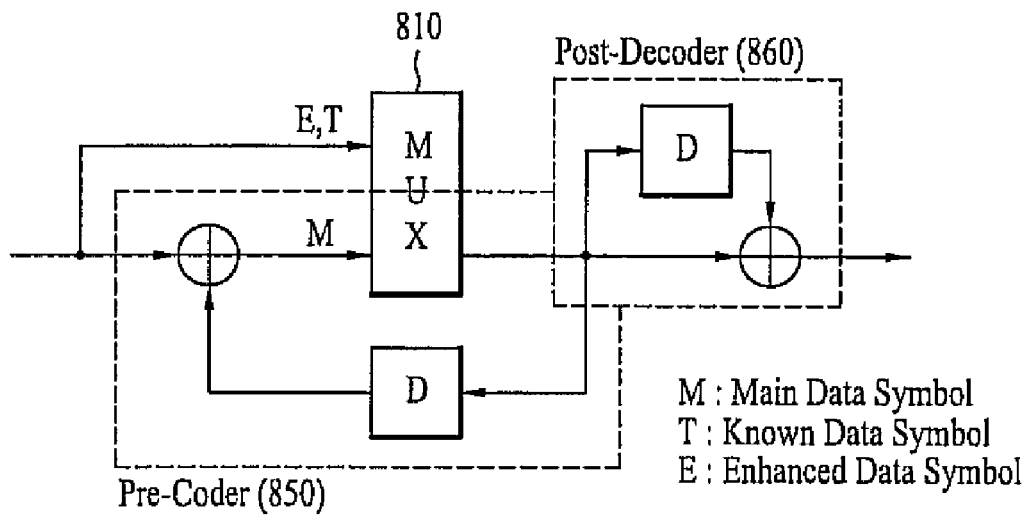

Accordingly, in the above-described structure, a separate post-decoder, as shown in FIG. 6, should be used in order to allow the known data to bypass the pre-coder. However, if the pre-coder bypass of FIG. 8B is used, the known data may bypass the pre-coder without having to use a separate pre-coder bypass. Herein, FIG. 8B illustrates a detailed block view of the pre-coder bypass according to another embodiment of the present invention. Referring to FIG. 8B, the pre-coder bypass according to the present invention includes a multiplexer 840, a pre-coder 850, and a post-decoder 860. Herein, the post-decoder 860 performs an inverse process of the pre-coder 850. The multiplexer 840 selects either an input bit or an output bit of the pre-coder 850 in accordance with the input data symbol type. Then, the multiplexer 840 outputs the selected input bit or output bit to the post-decoder 860. If the input data is one of an enhanced data symbol and a known data symbol, the multiplexer 840 selects the input bit. Conversely, if the input data is a main data symbol, the multiplexer 840 selects the output bit of the pre-coder 850. Thereafter, the selected bit is outputted to the post-decoder 860. Accordingly, the post-decoder 860 post-decodes and outputs the output of the multiplexer 840.

If a main data symbol is inputted to the pre-coder bypass of FIG. 8B, the inputted main data symbol sequentially passes through the pre-coder 850 and the post-decoder 860. Therefore, a value equal to that of the input bit is outputted. Accordingly, when the main data pass through the pre-coder included in the trellis encoder, the main data is pre-coded. Meanwhile, when the enhanced data symbol and the known data symbol are inputted, the input symbols only pass through the post-decoder 860. This indicates that when the symbols pass though the pre-coder of the trellis encoder, the enhanced data symbol and the known data symbol bypass the pre-coder. Accordingly, using the pre-coder bypass shown in FIG. 8B is advantageous in that an additional post-decoder is not required to be used in the known data generator.

Figure 9:
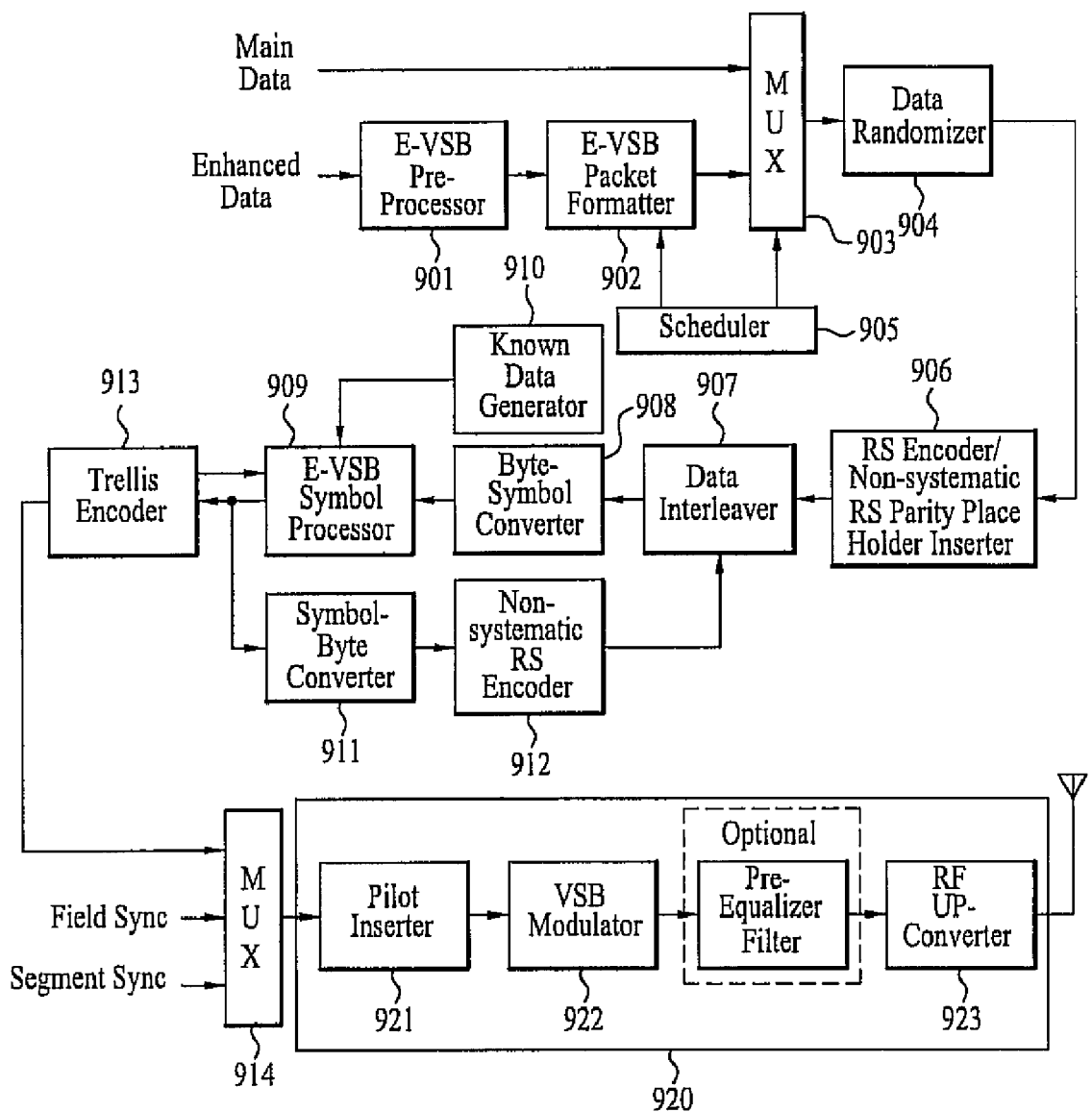
FIG. 9 illustrates a block view showing the structure of a digital television transmitter according to another embodiment of the present invention.

FIG. 9 illustrates an example of the digital television transmitter according to another embodiment of the present invention, which is provided with the known data generator. This digital television transmitter has already been disclosed by the same applicant of the present invention. In this case, an E-VSB packet formatter 902 decides a known data place holder in which the known data is to be inserted and, then, the E-VSB packet formatter 902 inserts null data in the decided known data place holder and outputs the null data-inserted known data place holder.

Therefore, if the data outputted from a byte-symbol converter 908 correspond to the known data place holder in which null data are inserted, an E-VSB symbol processor 909 replaces the output data of the byte-symbol converter 908 with a known data symbol generated from a known data generator 910. Thereafter, the E-VSB symbol processor 909 outputted the known data symbol to a trellis encoder 913 and a symbol-byte converter 911. At this point, the replaced known data are post-decoded by a pre-coder bypass included in the E-VSB symbol processor 909 and, then, outputted to the trellis encoder 913. Accordingly, if a known data sequence having the m-sequence property is inputted to the upper bit of the E-VSB symbol processor 909, the known data having the m-sequence property can be obtained without any change from the output bit C2 of the trellis encoder 913.

As described above, the digital television (DTV) transmitter and the method of processing known data in the DTV transmitter according to the present invention have the following advantages. More specifically, the digital television (DTV) transmitter and the method of processing known data in the DTV transmitter according to the present invention is highly protected against (or resistant to) any error that may occur when transmitting supplemental data through a channel. And, the present invention is also highly compatible to the conventional VSB receiving system. Moreover, the present invention may also receive the supplemental data without any error even in channels having severe ghost effect and noise.

Additionally, by inserting known data in a specific area of the data area and transmitting the processed data, the receiving performance of the receiving system liable to a frequent change in channel may be enhanced. The present invention is even more effective when applied to mobile and portable receivers, which are also liable to a frequent change in channel and which require protection (or resistance) against intense noise. Further, by generating and outputting known data so that the known data outputted from the trellis encoder are given m-sequence properties, the demodulation performance and the channel equalization performance of the receiver may be enhanced. Finally, by respectively allocating a preamble section and a postamble section at the beginning and end of a known sequence, and by copying a portion of the known data and adding the copied portion of the known data to the corresponding allocated preamble and/or postamble sections, the receiving performance may be further enhanced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing broadcast data in a digital broadcast transmitter, the method comprising:
   convolutional-encoding enhanced data with an N/M code rate, wherein N and M are natural numbers, and wherein N is less than M;
   deinterleaving the convolutional-encoded enhanced data;
   removing data bytes inserted for Reed-Solomon (RS) encoding from enhanced data packets including the deinterleaved enhanced data;
   RS encoding data in the enhanced data packets from which the data bytes are removed;
   interleaving the RS-encoded data, wherein the interleaved data includes a known data sequence that includes a first K-symbol sequence and a second K-symbol sequence that have a same pattern, and wherein K is an integer greater than 1;
   trellis-encoding the interleaved data with an M/L code rate, wherein L is a natural number, and wherein M is less than L; and
   multiplexing the trellis-encoded data with segment sync data and field sync data.

2. The method of claim 1, wherein N corresponds to 1, M corresponds to 2 and L corresponds to 3.

3. The method of claim 1, wherein the interleaved data further includes main data that is not convolutional-encoded.

4. A method of processing broadcast data in a digital broadcast receiver, the method comprising:

receiving a digital broadcast signal from a digital broadcast transmitter, wherein the digital broadcast signal was processed by:
  convolutional-encoding enhanced data with an N/M code rate, wherein N and M are natural numbers, and wherein N is less than M,
  deinterleaving the convolutional-encoded enhanced data,
  removing data bytes inserted for Reed-Solomon (RS) encoding from enhanced data packets including the deinterleaved enhanced data,
  RS encoding data in the enhanced data packets from which the data bytes are removed,
  interleaving the RS-encoded data, wherein the interleaved data includes a known data sequence that includes a first K-symbol sequence and a second K-symbol sequence that have a same pattern, and wherein K is an integer greater than 1,
  trellis-encoding the interleaved data with an M/L code rate, wherein L is a natural number, and wherein M is less than L, and
  multiplexing the trellis-encoded data with segment sync data and field sync data; and
processing the digital broadcast signal.

5. The method of claim 4, wherein N corresponds to 1, M corresponds to 2 and L corresponds to 3.

6. The method of claim 4, wherein the interleaved data further includes main data that is not convolutional-encoded.

* * * * *